(12) United States Patent
Flesher (10) Patent No.: US 7,066,062 B2
(45) Date of Patent: Jun. 27, 2006

(54) TORQUE-SETTING, TAMPER-RESISTANT FASTENER AND METHOD AND TOOL FOR USE WITH SAME

(76) Inventor: Robert W. Flesher, 611 E. Seminary Ave., Baltimore, MD (US) 21286

( * ) Notice: Subject to any disclaimer, the term of this patent is extended or adjusted under 35 U.S.C. 154(b) by 0 days.

(21) Appl. No.: 10/970,274

(22) Filed: Oct. 22, 2004

(65) Prior Publication Data

US 2005/0141986 A1    Jun. 30, 2005

Related U.S. Application Data

(60) Provisional application No. 60/513,739, filed on Oct. 24, 2003.

(51) Int. Cl.
*B25B 23/08* (2006.01)
*F16B 23/00* (2006.01)

(52) U.S. Cl. .................. 81/442; 81/450; 411/403

(58) Field of Classification Search .................. 81/436, 81/441, 442, 443, 450, 454, 455; 411/402, 411/403, 408, 901
See application file for complete search history.

(56) References Cited

U.S. PATENT DOCUMENTS

| | | | | |
|---|---|---|---|---|
| 755,804 A | * | 3/1904 | Smith | ......................... 411/402 |
| 806,398 A | * | 12/1905 | Crawford | ..................... 81/443 |
| 1,261,916 A | | 4/1918 | Forbes | |
| 1,298,398 A | | 3/1919 | Purple | |
| 1,300,275 A | | 4/1919 | Johnson | |
| 2,338,023 A | * | 12/1943 | Bugg | ......................... 411/403 |
| 2,338,024 A | | 12/1943 | Bugg | |
| 2,362,999 A | * | 11/1944 | Hewitt | ....................... 411/403 |
| 3,267,792 A | | 8/1966 | Yackle | |
| 3,369,441 A | | 2/1968 | Kosar | |
| 3,460,428 A | | 8/1969 | Charles | |
| 3,812,757 A | | 5/1974 | Reiland | |

(Continued)

FOREIGN PATENT DOCUMENTS

WO    WO 98/09886    10/1989

OTHER PUBLICATIONS

International Search Report and Written Opinion from International Application No. PCT/US04/35141, 10 pages, dated Sep. 2, 2005.

(Continued)

*Primary Examiner*—David B. Thomas
(74) *Attorney, Agent, or Firm*—Sterne, Kessler, Goldstein & Fox PLLC (57) ABSTRACT

A fastener includes a round, blind hole or pocket in its head. Installation and removal of the fastener is accomplished with a tool containing an eccentric segment on the end of a shaft. When rotated within the pocket, the eccentric segment displaces laterally relative to the shaft to provide a friction grip to the lateral wall of the pocket. The strength of the grip is proportional to the applied torque. Eccentric displacement allows rotation but prevents the tool from spinning out of the fastener thereby eliminating cam-out and surface damage resulting from contact with a spinning tool tip. The eccentric head of the tool can be made disposable and to shear off when a predetermined torque is reached. The smooth-sided round hole offers no purchase for commonly available tools; making the fastener tamper-resistance. In another embodiment, the fastener includes a raised portion in the pocket. A tool having a complementary opening shears off the raised portion at a predetermined torque.

16 Claims, 13 Drawing Sheets

U.S. PATENT DOCUMENTS

| | | |
|---|---|---|
| 3,929,054 A | 12/1975 | Gutshall |
| 4,018,111 A | 4/1977 | Goldhaber |
| 4,128,038 A | 12/1978 | Urwin |
| 4,144,796 A | 3/1979 | Richter et al. |
| 4,149,434 A * | 4/1979 | Wilson ........................ 81/461 |
| 4,167,886 A | 9/1979 | Seghezzi et al. |
| 4,258,596 A | 3/1981 | Bisbing et al. |
| 4,478,115 A | 10/1984 | Ellis |
| 4,776,442 A | 10/1988 | Young |
| 5,154,557 A | 10/1992 | Houck |
| 5,179,877 A * | 1/1993 | Down et al. .................. 81/443 |
| 5,256,015 A | 10/1993 | St. Clair |
| 5,544,675 A | 8/1996 | Dean |
| 5,713,705 A | 2/1998 | Grünbichler |
| 5,730,567 A | 3/1998 | Haseley et al. |
| 5,910,643 A | 6/1999 | Laine et al. |
| 5,927,917 A | 7/1999 | Gibbons |
| 6,186,718 B1 | 2/2001 | Fogard |
| 6,739,631 B1 | 5/2004 | Smith et al. |
| 6,764,114 B1 | 7/2004 | Guillon |
| 6,935,824 B1 | 8/2005 | Nowak, Jr. |
| 2005/0135898 A1 | 6/2005 | Bell et al. |
| 2005/0260058 A1 | 11/2005 | Cassagne, III |
| 2006/0039749 A1 | 2/2006 | Gawehn |

OTHER PUBLICATIONS

"Nipple Extractor" Manufactured in Taiwan for: Ace Hardware Corp., Oak Brook, Illinois 60521, USA, Item No. 43196, © 1996.

SPIN-LOK™, Bryce Fastener Mfg., Inc., 2 pages, printed Apr. 6, 2006 from the Internet at http://www/brycefastener.com/spinlok.htm, (publication date of Oct. 11, 2003).

* cited by examiner

TORQUE-SETTING, TAMPER-RESISTANT FASTENER AND METHOD AND TOOL FOR USE WITH SAME

BACKGROUND OF THE INVENTION

1. Field of the Invention

The present invention relates to the field of fasteners and, more particularly, to tamper-resistant fasteners (e.g., bolts) and to fasteners requiring tightening to a precise torque.

2. Related Art

In many instances it is necessary to prevent unauthorized intrusion or disassembly of a product in order to prevent theft or injury. Use of such fasteners on medical equipment ensures that unskilled individuals will not attempt adjustments. Use on cable set-top boxes prevents tampering with the electronics within. Use on public structures such as playground equipment, picnic benches, and on restroom fixtures prevents theft and disassembly-type vandalism.

While it is impossible to stop a determined thief, most applications of tamper-resistant technology require only that access be made very difficult unless a special tool is used. To accomplish this, prior designs modified the heads of commonly used bolts and screws to disallow removal using ordinary wrenches and screwdrivers. Once modified, the head of the fastener will only mate with a tool that incorporates the analog of the modified head. It is apparent that this method of creating a tamper-resistant fastener relies on the relative scarcity of installation tools.

Modifying the head of a fastener to incorporate offset holes, cam-like pockets or steps proves difficult to manufacture due to the high tolerances that must be held. As a result, the price of tamper-resistant fasteners is high. By necessity, the installation tools are encumbered with a complex, and often quite sharp or dangerous, tool tip. This becomes a hazard during installation when torque is applied and the tool tip cams out of the fastener head and skids across the articles being joined. This situation is highly undesirable, dangerous and happens far too often using existing designs. Cam-out is a major problem for manufacturers that focus on product quality such as the auto industry.

A further problem with standard and tamper-resistant fasteners relates to the inability to accurately torque down the fastener during install. Installation torque is dependent upon many factors and is often critical to holding an assembly together as designed. The most common method for applying a set amount of torque is to use a tool that incorporates a clutch that releases when a set rotational force is exceeded. Often these tools use a spring as the torque reference for the clutch. Stretching or compression of the spring over time introduces inaccuracies to the torque measurement. Electronic and manual installation tools utilize the same general principle and suffer the same inaccuracies. Electronic systems are generally used in the automotive and aircraft industries on, for example, door latches and components that may affect the safety of users/passengers.

What is needed is a better fastener and fastening system and method. Moreover, it would be extremely valuable for a fastener to incorporate a single use torque setting feature into its design. Installation tool maintenance and calibration would no longer be an issue if the fastener included a feature that would not allow over torqueing.

DETAILED DESCRIPTION OF THE INVENTION

In accordance with an embodiment of the present invention, a fastener incorporates a smooth-sided pocket (or bore) in the fastener head on centerline with the threads that can be made using a standard drill bit. A feature of this embodiment is a tamper-resistant fastener head geometry that may be adapted to various fasteners. The tamper-resistant fastener cannot be operated with conventional tools. A further feature of this embodiment is a fastener head geometry and installation tool that allows high installation torque with correspondingly high axial friction thereby preventing cam-out. The installation tool is easy to construct and can be adapted for either manual or automated use.

Another embodiment of the invention provides a fastener that can be precisely torqued to a desired value by virtue of a shear pin either on the installation tool or on the fastener itself.

A feature of an embodiment of this invention is a tamper-resistant fastener that can be used more than once, if desired.

Yet another feature of an embodiment of the present invention is a method of engaging the fastener so a disposable part of the installation tool tip or a disposable part of the fastener snaps off when a predetermined torque is reached thereby ensuring proper installation torque.

Yet a further feature of an embodiment the present invention is that the pocket in the headed-end (i.e., head) of the fastener is filled with a resilient material after installation thereby discouraging attempts to remove the fastener. The resilient material can also act as a vibration-reducing stand-off, bumper, or non-skid foot.

Still another feature of an embodiment of the invention is a tool that can be used with the fastener of the invention, with hex (Allen) head bolts, and/or with stripped hex bolts. Moreover, the tool of the invention can be used to remove broken bolts, studs and/or shanks from threaded holes.

Other features and advantages of this invention are described below or will be apparent to those skilled in the art based on the disclosure set forth herein.

Figure 1:
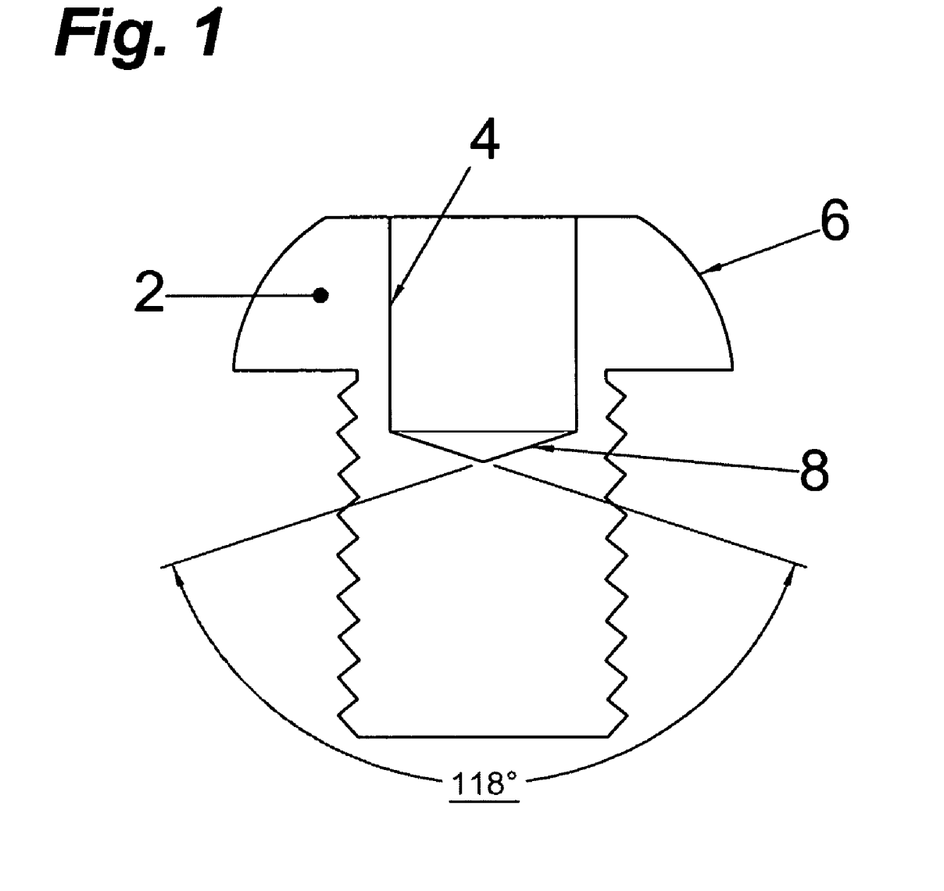
FIG. 1 is a cross-sectional side view of a representative fastener head illustrating a cylindrical straight-walled pocket in accordance with an embodiment of this invention.

FIG. 1 illustrates a representative construction of a tamper-resistant fastener 2 according to an embodiment of the invention. The outer sidewall 6 of the fastener head is preferably chamfered or radiused to make it difficult to apply torque to the fastener with any standard tool. The head of the fastener is attached to a conventional threaded shank, which may be installed as would a normal screw or bolt. The pocket 4 in the fastener head 2 has cylindrical, straight and substantially parallel sidewalls 4 of a type that would be created through the use of a standard metal drill bit. The one hundred and eighteen degree (118°) included angle at the bottom of the pocket 8 is not critical but chosen to match the one hundred and eighteen degree (118°) cutting end geometry of commonly available twist drills of the type used on high speed equipment.

In the fastener embodiment described by FIG. 1, the head of the fastener is preferably made of hardened steel to resist attempts to tap, cut into or form a means of engagement for a conventional screwdriver or other removal tool.

Figure 2:
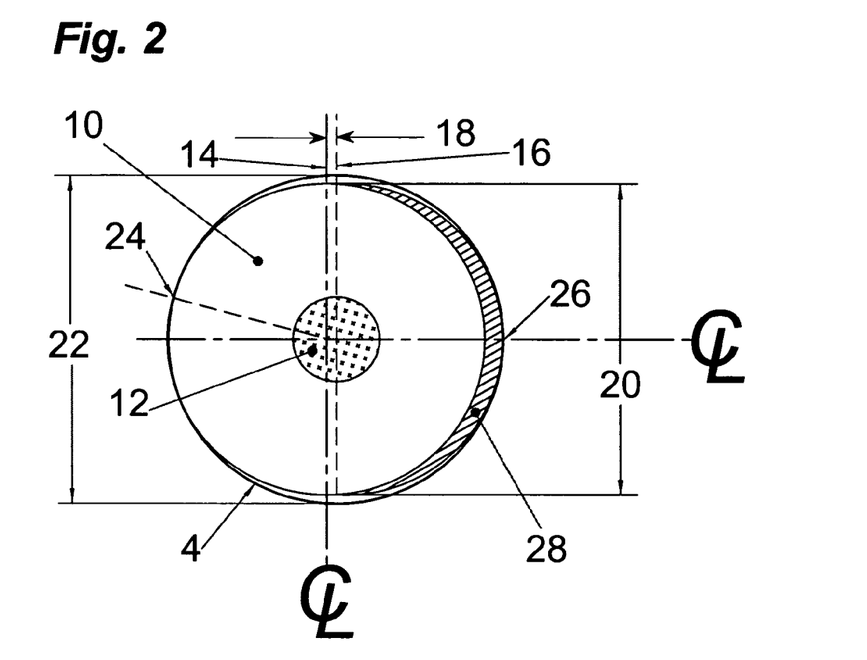
FIG. 2 is an end view of the installation tool illustrating the eccentric relationship between the tool shaft, rotation pin and the tool tip.

FIG. 2 illustrates the end view of one embodiment of an installation tool needed to rotate the fastener shown in FIG. 1 and the relationships necessary to enable the tool tip 10 (also called a bit), rotation pin 12 and the tool shank 28 (also called a shaft) to act in concert to apply rotational force to fastener pocket 4. Rotation pin 12 is inserted through the tool tip 10 and into the tool shank 28. The rotation pin 12 allows the tool tip 10 to rotate freely about it but is fixed within the tool shank 28 by a frictional or press fit, retaining adhesive such as Loctite 680 from the Loctite Corporation, a setscrew or any other manner of attachment. The tool tip 10 and tool shank 28 are sized to create a free fit within the pocket 4 of the fastener 2, when both the tool tip 10 and tool shank 28 are concentric and axially aligned to create a cylinder. When this condition is met, the installation tool composed of the tool tip 10, the rotation pin 12 and the tool shank 28 may be inserted or withdrawn from the pocket 4 of fastener 2 without difficulty, because the installation tool diameter 20 is smaller than the fastener pocket diameter 22.

Rotation pin 12 is inserted axially through the tool tip 10 into the tool shank 28 on an axis 16 that is offset a small distance 18 from the central axis 14 of shank 28 and tip 10. In this configuration, when the tool tip 10 is rotated one hundred and eighty degrees (180°) relative to the tool shank 28, the effective diameter of the tool tip 10 and tool shank 28 will be increased by two times the offset 18. The increase in diameter will cause the tool tip 10 to axially contact the fastener 2 pocket surface 4 at position 24, while the tool shank axially contacts the pocket surface 4 at position 26; thereby imparting a large tangential force component due to the relative eccentric motion of the installation tool components. The tangential force exerted by the installation tool components against the fastener 2 pocket sidewalls 4 is proportional to the torque applied to the tool shank 28 by either manual or mechanical means. By nature of the design, tangential force is only applied to the fastener 2 pocket sidewalls 4 at positions 24 and 26 when torque is applied to the tool shank 28, thus substantially eliminating the tendency of the driving tool to pull out or cam out of the fastener.

In a preferred embodiment, for example, the single axis offset 18 will be at least twenty percent (20%) greater than the difference between diameter 20 (of the tool tip 10 and tool shank 28 when concentrically aligned) and diameter 22 (of the pocket 4 of fastener 2).

Figure 3:
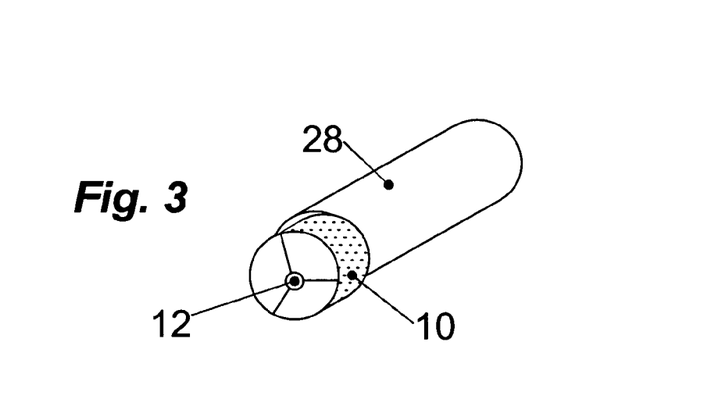
FIG. 3 is an orthometric view of an installation tool that may used to turn the fastener of an embodiment of this invention and shows the relationships between components illustrated in FIG. 2.

When the tool tip 10 of the installation tool shown in FIG. 3 is inserted into the pocket 4, and pressed against the bottom surface 8 of the pocket 4 of fastener 2, it will resist rotation relative to the tool shank 28 and cause the tool shank 28 to rotate relative to the tool tip 10 and thus frictionally engage the sidewall of pocket sidewall.

FIG. 3 is an orthometric view of a special drive tool needed to apply torque to the tamper-resistant fastener of FIG. 1, with the tool tip 10 one hundred and eighty degrees (180°) out of alignment with the tool shank 28. It should be noted that the maximum torque that can be applied to the shank 28 and tip 10 combination is limited by the shear strength of the rotation pin 12.

Figure 4:
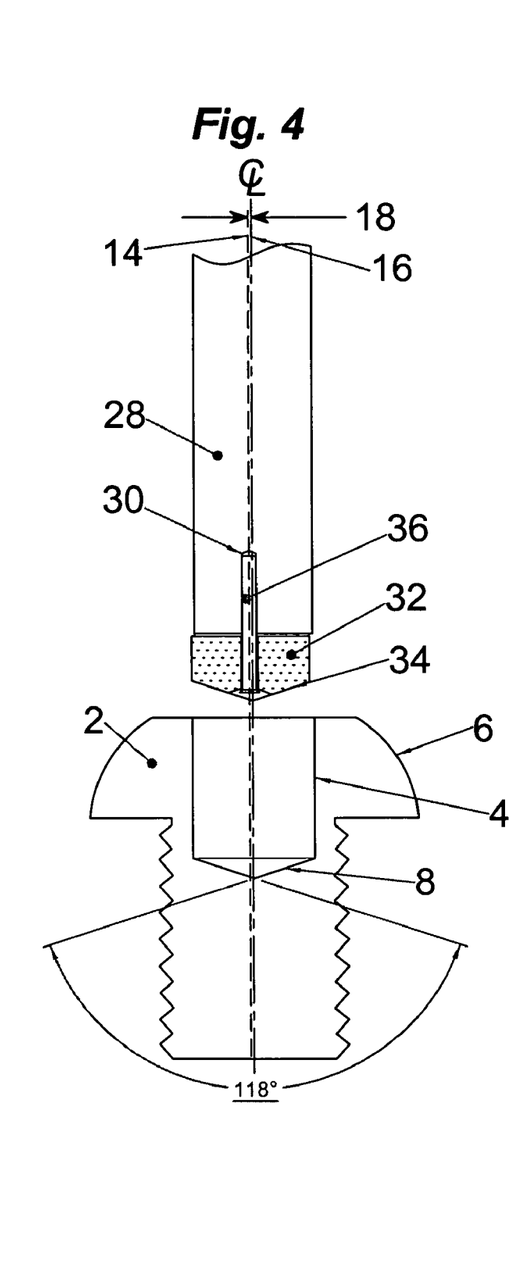
FIG. 4 is a cross-sectional view of one type of installation tool that may be used to turn the fastener of an embodiment of this invention and a representative fastener.
Figure 5:
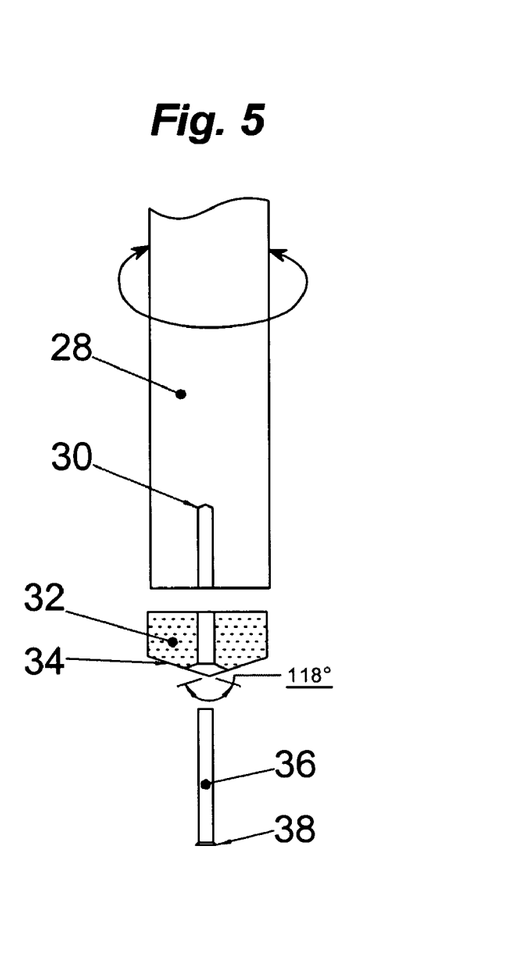
FIG. 5 is an exploded view of the parts necessary to make the installation tool of FIG. 4.

FIGS. 4 and 5 show installation tip geometry as illustrated in FIG. 2 and FIG. 3. In this embodiment of the installation tool, the tool tip 32 is referenced and held to the end of the tool shank 28 by a rotation pin 36 that mates with a receiving hole 30 in the tool shank 28 through the tool tip. The rotation pin has a flattened head 38 that will not allow the tool tip 32 to slip off the rotation pin 36. This keeps the tool tip 32 in offset axial alignment 18 with the tool shank 28 while still allowing it to rotate freely relative to the tool shank 28.

Figure 6:
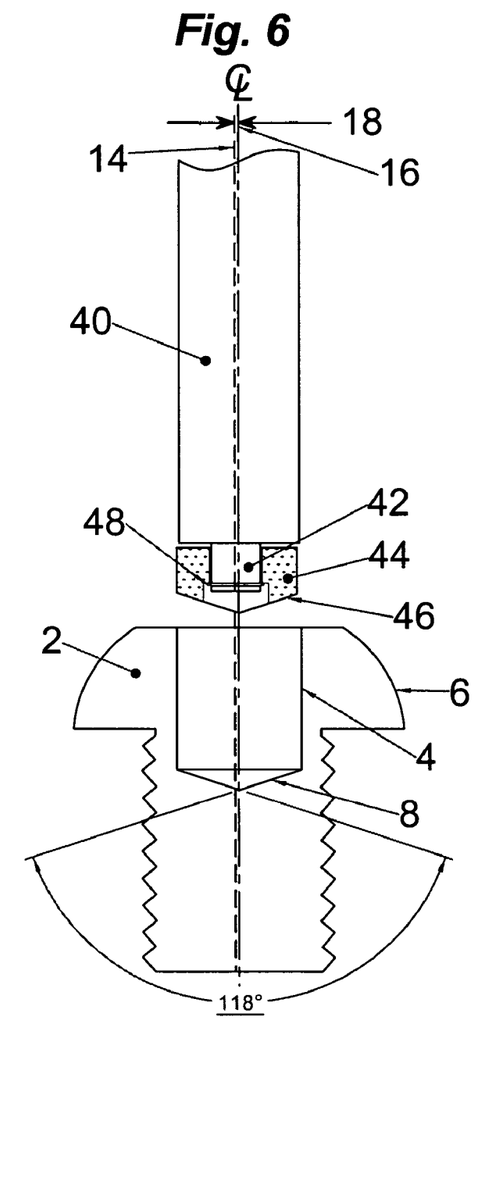
FIG. 6 is a cross-sectional view of another version of an installation tool with a rotation pin integral to the tool shank and a representative fastener.
Figure 7:
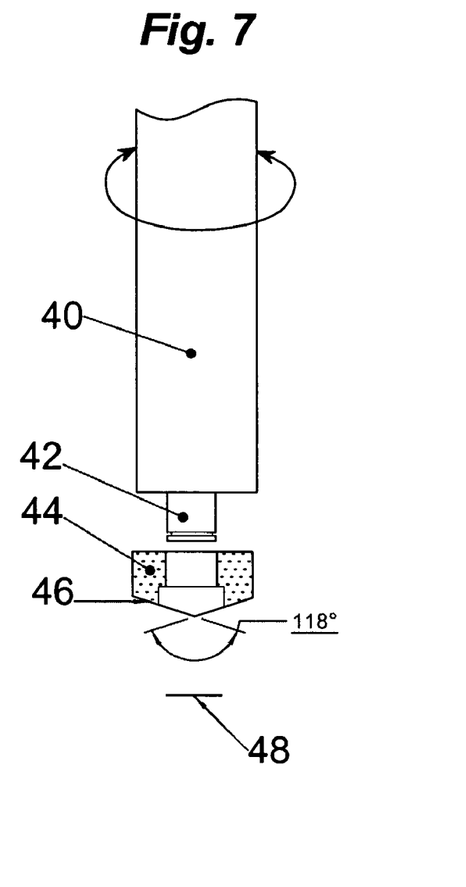
FIG. 7 is an exploded view of the parts necessary to make the installation tool of FIG. 6.

FIGS. 6 and 7 show installation tip geometry as illustrated in FIG. 2 and FIG. 3. In this embodiment of the installation tool, however, the tool tip 44 is referenced and held to the end of the tool shank 40 by a rotation pin 42 that is turned or machined into the tip of the tool shank 40. The rotation pin 42 mates with the tool tip 44 through a hole in the tool tip 44 allowing free rotation of the tool tip 44 about the rotation pin 42 which is part of the tool shank 40. A clip 48

(e.g., a "C" clip) can be installed over the rotation pin 42 in such a manner that the tool tip 44 is captured to the tool shank 40 by the clip 48. It should be understood that there are many other ways to secure the tool tip 44 to the rotation pin 42 so that it does not fall off. For example, the rotation pin 42 and/or the tool tip 44 can be magnetized such that magnetic force holds the tool tip on the rotation pin. Alternatively, the end of the rotation pin 42 can be coined, peened or swaged to increase its diameter at its distal end which extends through a portion of the tool tip. Other securing means and methods will be apparent to those skilled in the relevant art.

Figure 8:
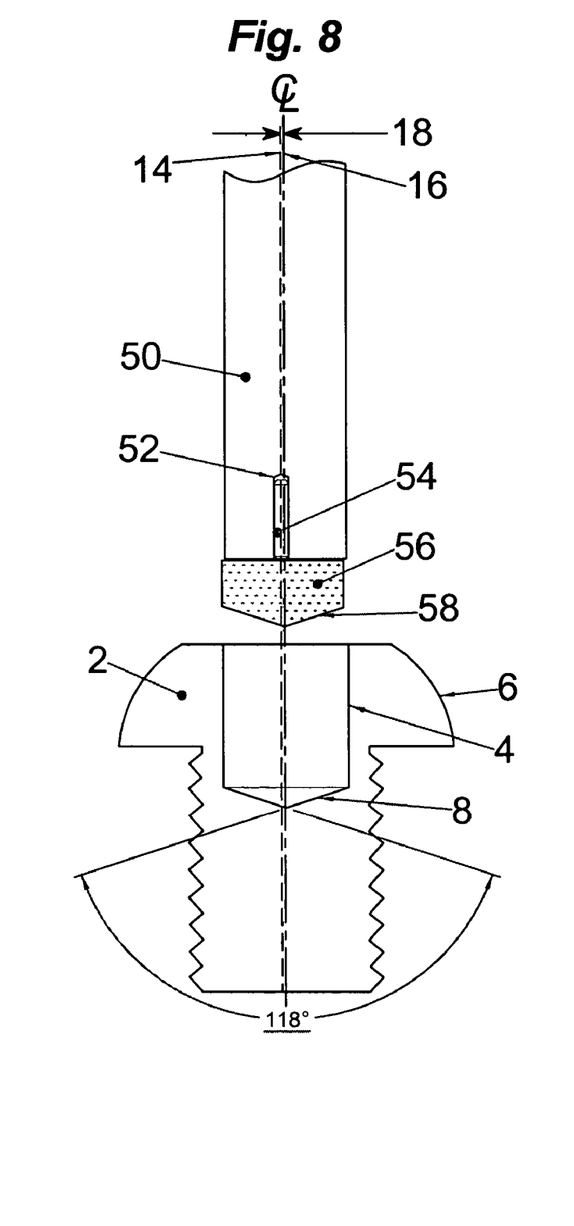
FIG. 8 is a cross-sectional view of a representative fastener and another version of an installation tool that illustrates the use of a rotation pin integral to the tool tip that is designed to shear off when a pre-determined installation torque is applied.
Figure 9:
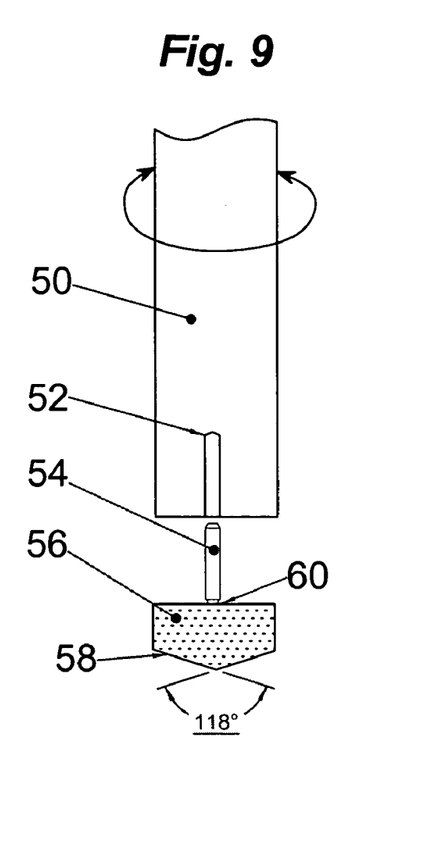
FIG. 9 is an exploded view of the parts necessary to make the installation tool of FIG. 8.

FIGS. 8 and 9 show installation tip geometry as illustrated in FIG. 2 and FIG. 3. In this further embodiment of the installation tool, the disposable, single use, tool tip 56 is referenced to the end of tool shank 50 by a rotation pin 54 that is turned, machined, pressed, welded or adhered to the tool tip 56. The rotation pin 54 freely mates with a hole or bore 52 of shank 50 allowing rotation of the tool tip 56 about rotation pin 54. The base 60 of the rotation pin 54 is scored or substantially relieved in a manner calculated to place the rotation pin 54 under great shear force when the tool tip 56 and tool shank 50 are rotated in an eccentric manner relative to each other as illustrated by FIG. 2. At the pre-calculated torque, rotation pin 54 will shear off at the relieved portion 60 of the pin, and the tool shank 50 will freely rotate within the pocket 4 of fastener 2, thus preventing further tightening of the fastener 2. It should be understood that there are many ways to modify the tool tip 56 and rotation pin 54 such that the tool tip 56 may be retained in the fastener 2 or withdrawn by the installation tool for disposal.

After shear-off, pin 54 will fall out of bore 52 thereby clearing bore 52 for use of tool shank 50 with another tool tip 56 and pin 54. Alternatively, in an alternate embodiment of the tool of FIGS. 8 and 9, bore 52 can be extended through shank 50. A spring-loaded rod or plunger (not shown) could then be positioned within bore 52 for ejecting the sheared pin from the distal end of the bore.

Means may also be added to tool shank 50 to retain pin 54 until it is manually removed. Such means may include, for example, a reduced diameter or necked down portion of bore 52 to add additional friction to retain the pin 54 in the bore 52. A thin disk of compliant material (e.g., silicone, rubber or the like) covering the end of shank 50 can also be used. A reduced diameter hole in the disk could allow passage of pin 54 through the disk and into bore 52 and would provide friction to hold pin 54 in place. A spring actuated retaining ring or ball bearing could also be used within bore 52 to apply a frictional force to pin 54 and optionally mate with a groove or indentation on pin 54. Other means for holding pin in bore 52 will be apparent to a person skilled in the relevant art.

Figure 10:
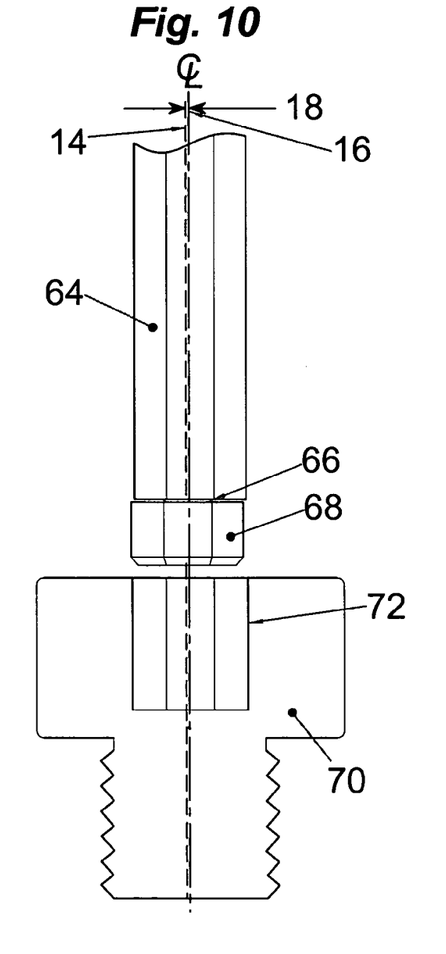
FIG. 10 is a cross-sectional view of a representative fastener with a hex pocket and a hex or 'Allen' wrench tool in accordance with an embodiment of the invention that illustrates use of a rotation pin integral to the tool shank.
Figure 11:
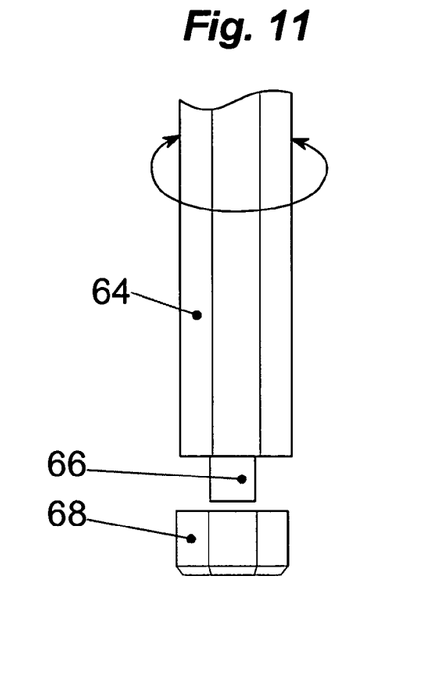
FIG. 11 is an exploded view of the parts necessary to make the installation tool of FIG. 10 and top view of a typical hex headed fastener.
Figure 12:
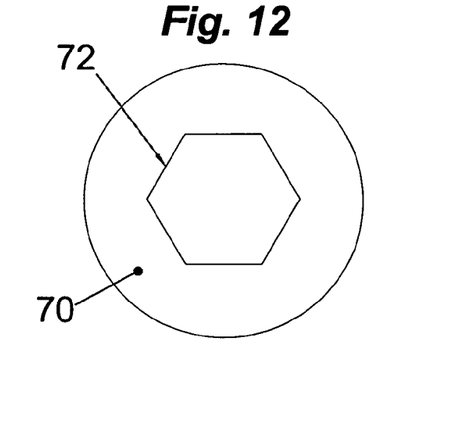
FIG. 12 is a top view of the hex fastener of FIG. 10.

FIGS. 10 and 11 show installation tip geometry as illustrated in FIG. 2 and FIG. 3 but specifically adapted to a hex-headed fastener 70 which is conventionally installed using a hex shaped tool often called an 'Allen' wrench. FIG. 12 is a top viewing illustrating the hexagonal pocket 72 formed in the top of hex bolt 70. In this embodiment of the installation tool 64, the tool tip 68 is referenced and held to the end of the tool shank 64 by a rotation pin 66 that mates with a receiving hole in the tool tip 68. The rotation pin 66 and attachment method may be substantially similar to any of those described above with reference to FIGS. 4–5, 6–7 or 8–9. The separate rotation pin 36 or integral rotation pin 66 may have a flattened head 38 that will not allow the tool tip 68 to slip off the rotation pin 66, thus keeping the tool tip 68 in offset axial alignment 18 with the tool shank 64 but allowing it to rotate freely relative to the tool shank 64.

Damage to the walls of the hex pocket 72 in the head of a cap head or button head bolt 70 often causes the pocket to become substantially rounded, hindering or preventing engagement by the hex perimeter of a standard hex or Allen tool. The invention solves this problem. As illustrated in FIGS. 10 and 11, the shank 64 and tool tip 68 are formed in a hexagonal shape to mate with the hexagonal pocket 72 of the hex bolt 70. This brings the advantages of an embodiment of the invention as described above to a hex fastener. In so doing, the shank 64 and tool tip 68 will tightly engage with hex pocket 72 and prevent cam-out or stripping of pocket 72. Furthermore, the tool can be used to remove hex bolts that have been stripped by a conventional tool. The novel locking/gripping feature of this embodiment of the invention will tightly couple to the lateral walls of a stripped hex pocket.

While not as ideal, the offset rotational driving geometry described in FIG. 2 will also allow a round tipped installation tool as illustrated in FIGS. 4–9 to install or remove a fastener with a hex pocket if the tool shank and tool tip are slightly smaller in diameter than the inscribed perimeter of the fastener pocket 72.

Figure 13:
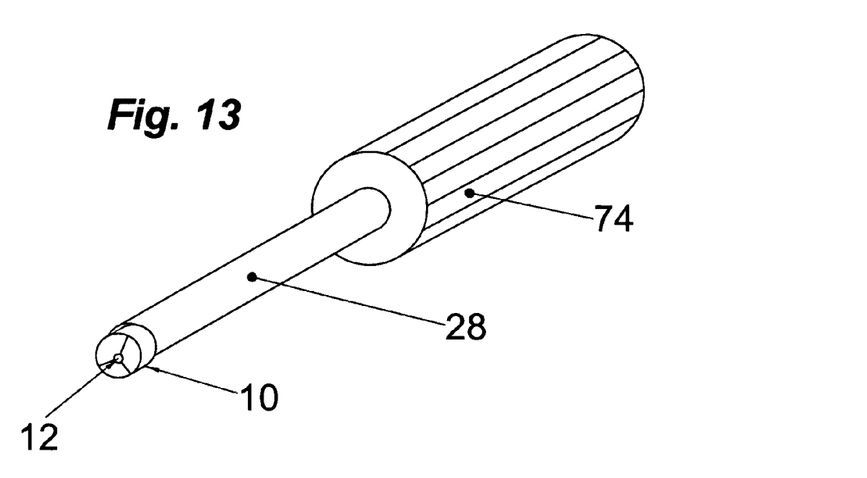
FIG. 13 is an orthometric view of the shaft, tip, rotation pin and handle that would comprise a hand installation tool in accordance with the present invention.

FIG. 13 illustrates a hand installation tool with an integral hand grip 74 connecting axially to a tool shank 28 (or any of the other tool shanks discussed above) and tool tip 10 (or any of the other tool tips discussed above) of construction described herein. For use in a pneumatic or electrically actuated tool, the tool shank may incorporate flats or ridges at the driving end or be machined to fit into a standard drill chuck or hex bit adaptor.

Figure 14:
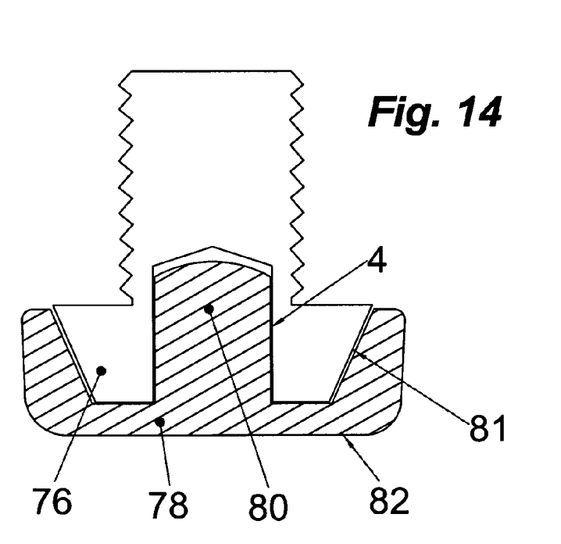
FIG. 14 is a cross-sectional view of a fastener designed to accept a molded rubber or thermoplastic rubber cap that serves as both a foot and a means of concealing the cylindrical pocket.

FIG. 14 shows an embodiment of a tamper-resistant fastener 76 according to an embodiment of the invention. Fastener 76 has a sloped circumferential or radial surface 81 about its head. Like the radiused head of fastener 2 (see FIG. 1), the sloped surface 81 makes it difficult for a tool such as pliers to get a grip on the head of fastener 76. This enhances the tamper-resistance of fastener 76 by making it difficult to remove with standard tools.

FIG. 14 also illustrates how the pocket 4 of fastener 76 can further serve as a receptacle for a projection 80 of an elastomer anti-skid foot 78. Foot 78 can be made from rubber, an injection moldable thermoplastic such as Dupont ENGAGE®, or any other resilient material so that the bottom surface 82 prevents scratching or unwanted movement. On products such as a TV set-top box, the fastener 76 of this embodiment can be used to hold the unit together. Once installed, molded foot caps 78 can be pressed into pocket 4 of fastener 76 and held in place by projection 80; thus providing a foot that is resistant to side loads and camouflages the nature of the underlying tamper-resistant fastener. The foot 78 can also act as a resilient bumper or vibration-isolating standoff.

Thus, as described above, a tool constructed in accordance with embodiments of the invention can be used with a bolt having a cylindrical (i.e., circular) pocket or bore. A tool according to the invention can also be used with fasteners having other shapes such as hexagon-shaped (e.g., an Allen head bolt). Furthermore, the tool can be used to remove (or install) bolts which have pockets that have been stripped (i.e., a slipping tool, such as a conventional Allen wrench, has turned within the pocket and has rounded-off the corners of the hexagon-shaped pocket). Because the tool does not require edges to develop grip or purchase, the tool will effectively remove stripped bolts.

Furthermore, the tool can be used to extract a broken bolt, shank or stud. Conventionally, a broken shank is removed by drilling a hole in it and inserting a tool known as an easy-out, EZ-out, or stud extractor. When the easy-out is rotated within the hole, edges of the easy-out are supposed to "bite" into the lateral walls of the hole and transfer torque from the easy-out to the broken shank. Unfortunately, the easy-out often is unable to get sufficient bite to transfer sufficient torque to remove the broken shank. Furthermore, the easy-outs are typically made from very hard, brittle material and are easily broken-off in the shank.

In contrast, the eccentric, cam-like action of the tool grips a broken shank without requiring the hardening that makes the easy-outs so easily broken. In operation, the tool can be inserted into a hole drilled into a broken shank. Torque can then be applied to the shaft of the tool to remove the shank. The tool effectively transfers the torque from the shaft to the broken shank without slippage.

Additional embodiments of the invention are shown in FIGS. 15–25. These embodiments are particularly useful for applying a precise tightening torque to a fastener.

Figure 15:
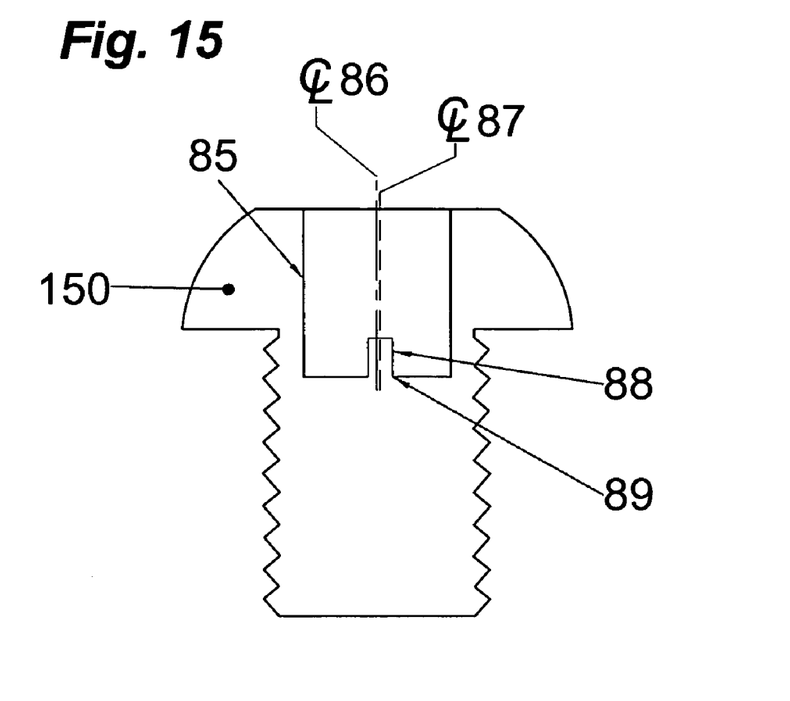
FIG. 15 is a cross-sectional view of another embodiment of a fastener according to the invention.

FIG. 15 is a sectional view of a fastener 150. Fastener 150 is similar to the fasteners described above, having a round or cylindrical pocket formed in the head thereof. However, fastener 150 includes a pin 88 integrally formed (e.g., by molding, forging or machining) in the pocket 85. Pin 88 is configured to shear off at a point 89 at a predetermined torque. By controlling the composition and diameter of pin 89, the predetermined torque can be tightly controlled and predicted.

Figure 16:
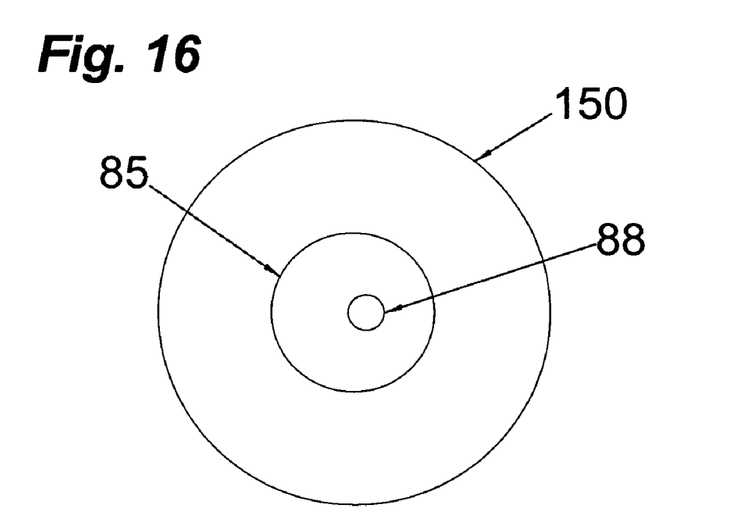
FIG. 16 is a top view of the head of the fastener of FIG. 15.

FIG. 16 is a top view of the fastener of FIG. 15, illustrating pin 91 in pocket 85. Note that pin 88 is offset from a center axis of fastener 2. This is illustrated in FIG. 15 by an offset between axes 86 and 87, where axis 86 is the central axis of fastener 150, and axis 87 is the central axis of pin 88.

Figure 17:
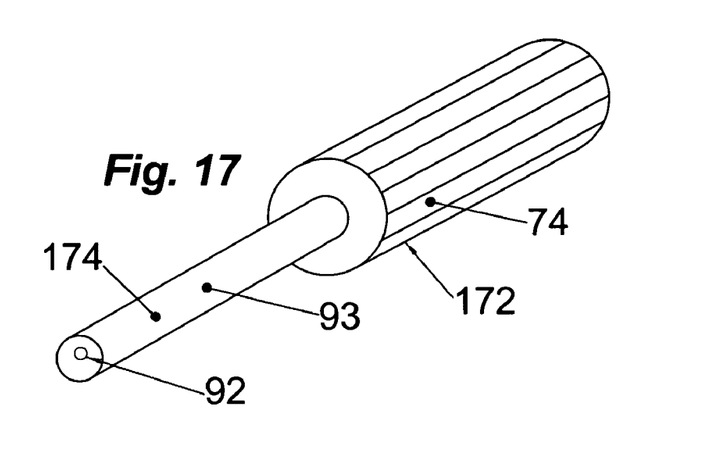
FIG. 17 is a tool for installing the fastener of FIG. 15.

Fastener 150 can be installed using a tool 172 as shown in FIG. 17. Tool 172 includes a handle 74 and a shank 93. An axial bore or hole 92 formed in the distal end of shank 93 is adapted to receive pin 88. As discussed in detail above for alternate embodiments of the invention, bore 92 is offset from the center axis of the shank 93. Unlike the previously described embodiments, however, there is no separate tool tip attached to tool 172.

Figure 18:
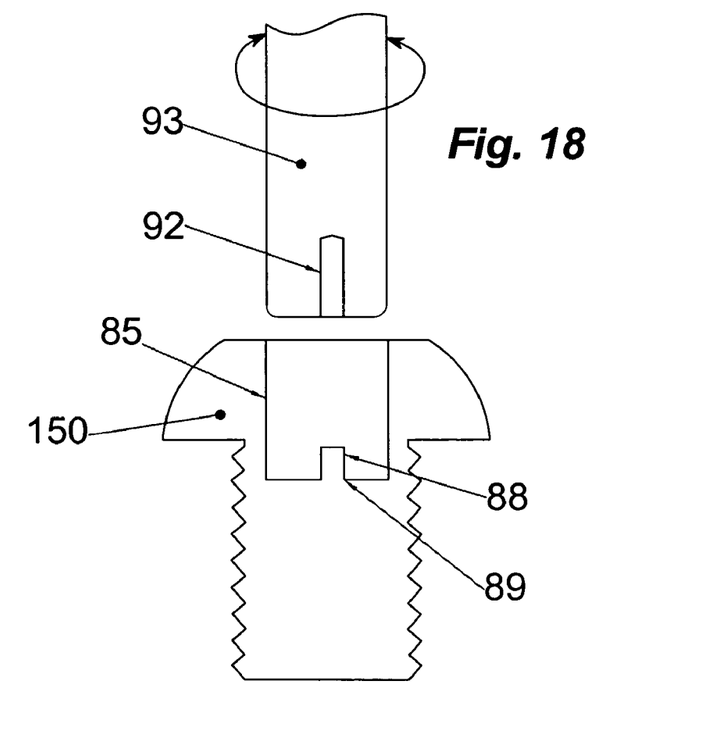
FIG. 18 is a cross-sectional view of the fastener of FIG. 15 aligned for mating with the tool of FIG. 17.

As shown in FIG. 18, the circumferential surface 174 of the distal end of tool shank 93 is adapted to mate with the inner walls of pocket 85 of fastener 150. The axial offset of bore 92 is matched to the axial offset of pin 88. Thus, when the properly aligned, the distal tip of shank 93 can be inserted into pocket 85 and pin 88 is inserted into bore 92. Thereafter, rotation of shank 93 relative to fastener 150 will cause the circumferential surface 174 of shank 93 to engage the inner wall of pocket 85 such that torque on shank 93 can then be imparted to fastener 150.

If the applied torque exceeds the shear strength of pin 88, then pin 88 will shear off, preventing additional torque from being applied to fastener 150. As discussed above, pin 88 is configured to shear off in this manner, and the composition and diameter of the pin can be chosen to precisely control the maximum torque that can be applied to the fastener.

Figure 19:
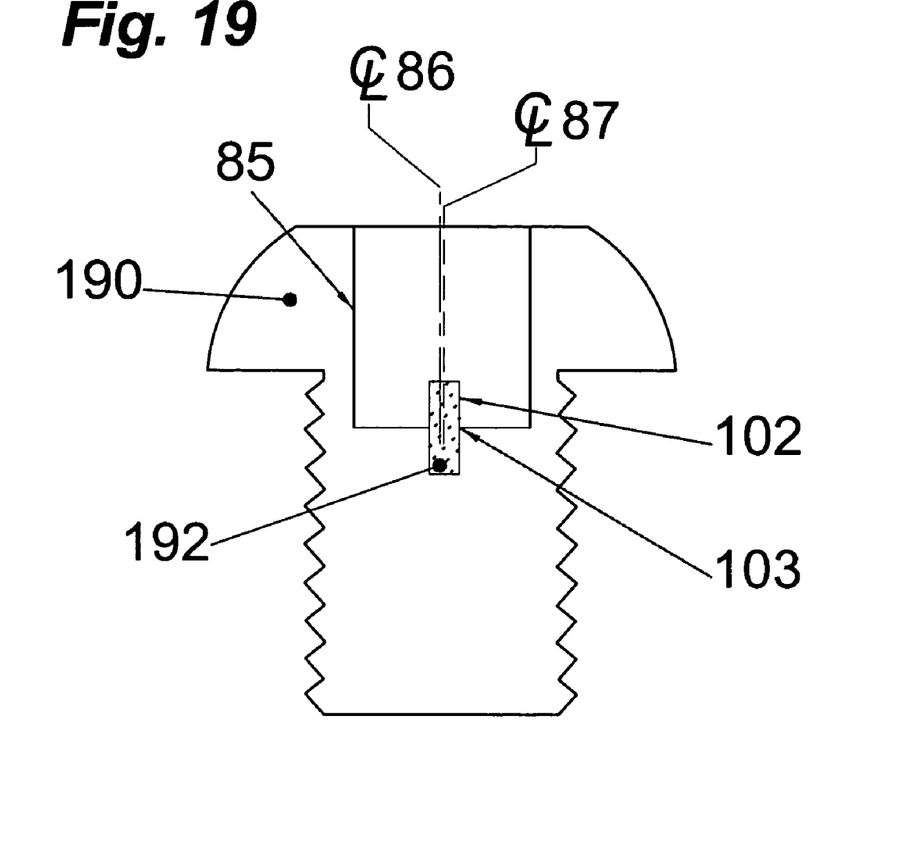
FIG. 19 is a cross-sectional view of another embodiment of a fastener according to the invention.

An alternate embodiment 190 of fastener 150 is shown in FIG. 19. Fastener 190 is similar to fastener 150, except that pin 88 has been replaced with a pin-receiving hole or bore 192 formed in the body of the fastener in the place of pin 88. Bore 192 is configured to receive a pin 102. Pin 102 may be secured in bore 192 by a friction or press fit, an adhesive, welding, soldering or some other means. Like pin 88, pin 102 is configured to shear off at a point 103.

An advantage of fastener 190 as compared to fastener 150 is that a different material can be used to form pin 102. For example, pin 102 can be very precisely formed from metal or sintered metal (e.g., by extrusion, turning, casting or the like) or from a plastic (e.g., by extrusion, injection molding or the like) or from another suitable material. Manufacture of fastener 190 may be more complicated, because an additional step is required to insert the pin in bore 192. However, the additional complexity may be justified for many applications.

Figure 20:
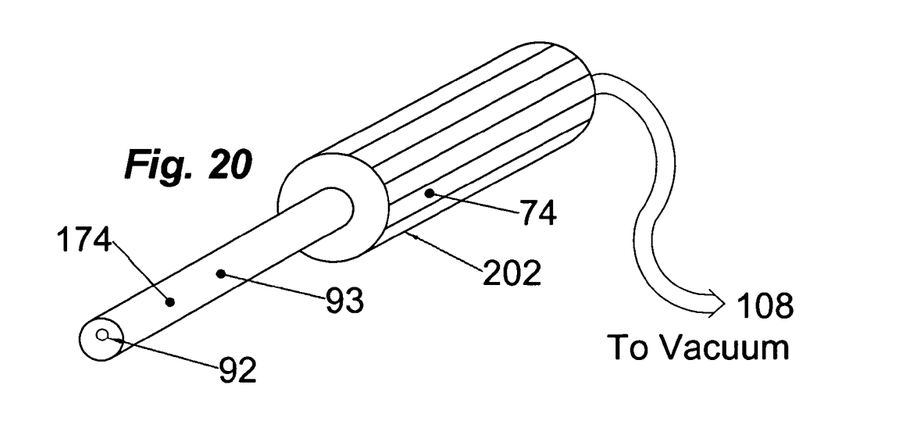
FIG. 20 is an installation tool which uses a vacuum to remove a shear pin after it is sheared from a fastener.
Figure 21:
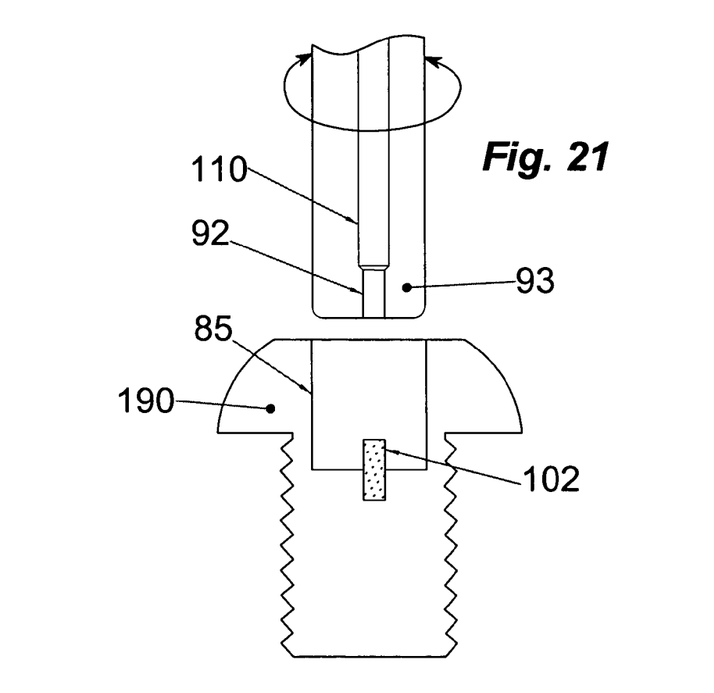
FIG. 21 is a cross-sectional view of the fastener of FIG. 19 aligned for mating with the tool of FIG. 20.

Fastener 190 can be installed using a tool 172 as shown in FIG. 17. Alternatively, a tool 202 can be used for either fastener 150 or 190. Tool 202, shown in FIGS. 20 and 21, is similar to tool 172. However, the axial bore or hole 92 in shank 93 is connected to a vacuum source 108. As illustrated, bore 92 is coupled to a larger diameter bore 110 that passes through shank 93 to deliver a vacuum to the distal tip of shank 93. Upon shearing of pin 102, the vacuum will pull pin 102 through shank 93 and into a waste/recycle receptacle (not shown) associated with the vacuum source.

In another embodiment of the invention, the surface of the bit and/or the surface of the end of the tool shaft adjacent the tip can be roughened to enhance the bite, grip or purchase that the tool will make when inserted into a smooth pocket or bore. For example, these surfaces can be serrated. Alternatively, carbide or diamond particles can be embedded in the surfaces.

In another embodiment, an end cap (e.g., made from a plastic or rubber based material) can be attached to the distal end of the bit. For example, referring to FIG. 7, a plastic end cap could be attached to the distal end of bit/tip 44. This end cap will help prevent the tool from scratching surfaces adjacent a bolt in the event that a user misaligns the tool with the bolt head when attempting to use the tool. This feature would be especially advantageous to working environments like automobile manufacturing plants where scratch damage is a major concern.

Figure 22:
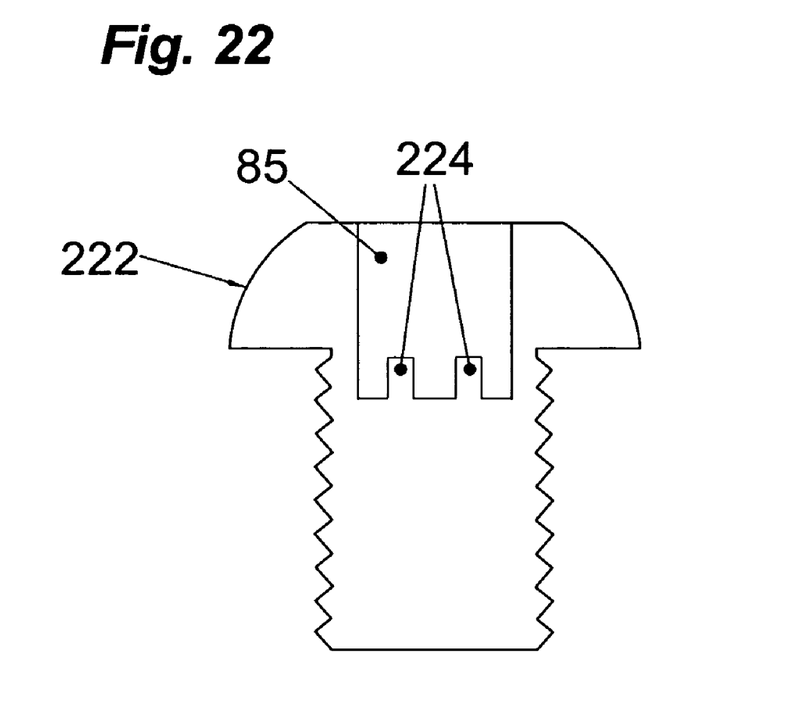
FIG. 22 is a cross-sectional view of another embodiment of a fastener according to the invention.
Figure 23:
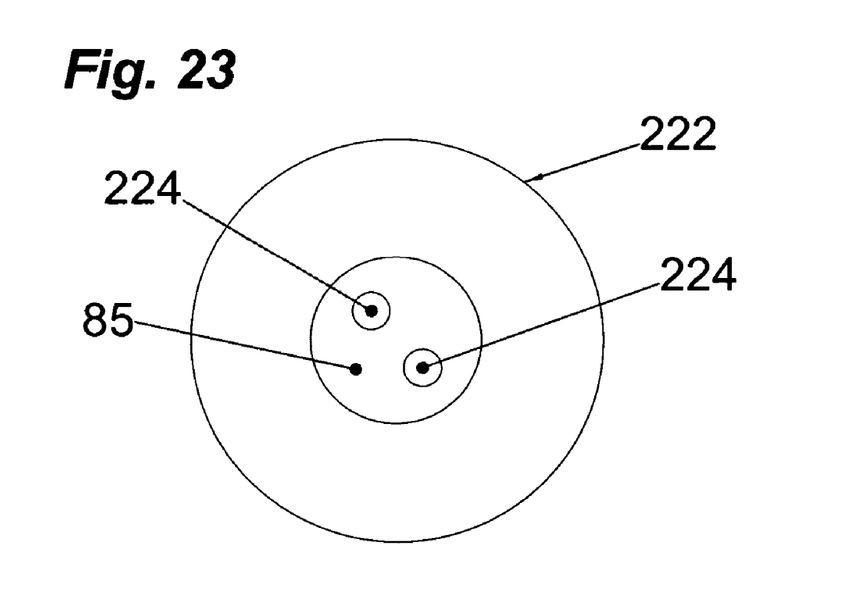
FIG. 23 is a top view of the head of the fastener of FIG. 22.

As will be apparent to a person skilled in the art after reviewing the embodiments of FIGS. 15, 16, 18, 19 and 21, advantages of embodiments of the invention may also be obtained in a fastener that does not use the eccentric concept. For example, FIG. 22 is a sectional view showing a fastener 222 having a pocket 85 in which two pins 224 are formed (or placed, e.g., by pressing into corresponding holes). FIG. 23 is a top view of fastener 222. Note that a corresponding tool shank (e.g., similar to that of FIG. 17) would have bores corresponding to pins 224. The pins could be used to drive fastener 222 to a desired torque at which point pins 224 would shear off.

Figure 24:
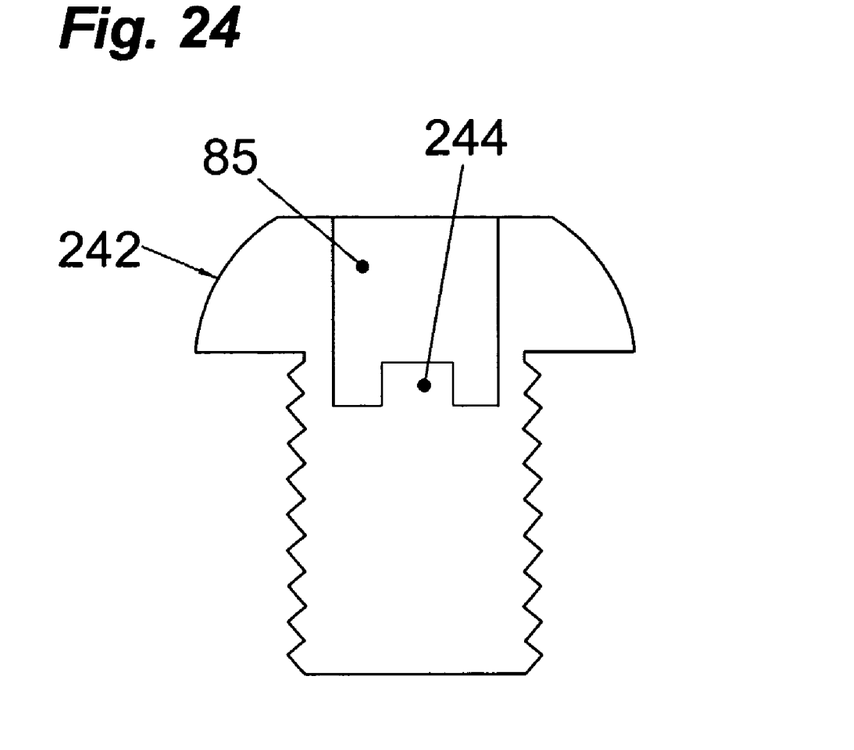
FIG. 24 is a cross-sectional view of another embodiment of a fastener according to the invention.
Figure 25:
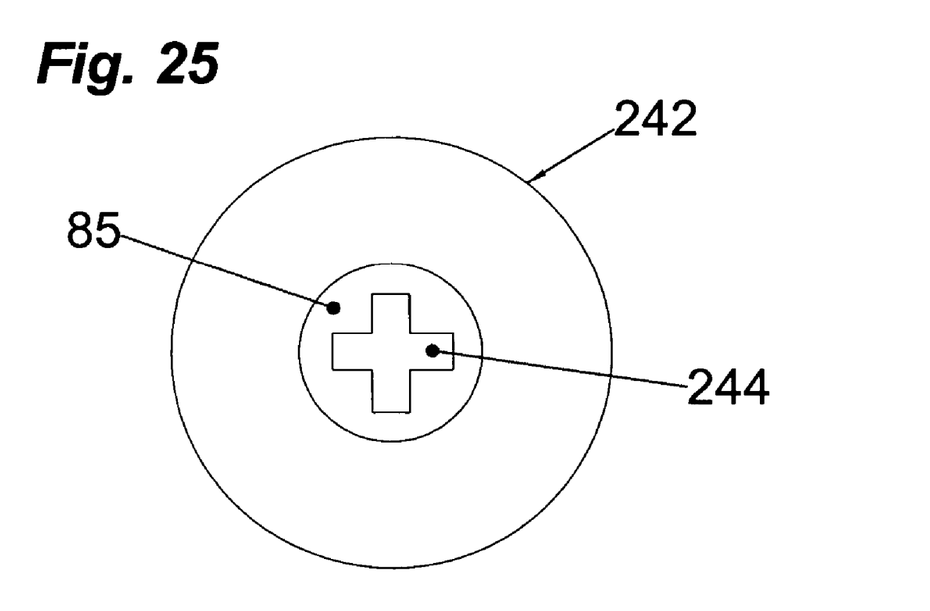
FIG. 25 is a top view of the head of the fastener of FIG. 24.

As another example, FIG. 24 is a sectional view showing a fastener 242 having a pocket 85 in which a raised portion 244 is formed (or mounted). FIG. 25 is a top view of fastener 242. Note that the plus sign shape of raised portion 244 will provide a tool with purchase or grip to transfer torque to fastener 242. Note also that a corresponding tool shank (e.g., similar to that of FIG. 17) would have a bore having a shape complementary to raised portion 244. Raised portion 244 would allow the fastener to be drive to a desired torque at which point raised portion 244 would shear off.

Based on these examples, it will be apparent to a person skilled in the art that other configurations and shapes of raised portions can be used in the pocket of a fastener to drive the fastener and to then shear off at a desired torque. Such other configurations and shapes are within the scope of this embodiment of the invention. The term "raised portion"

as used herein is intended to include pins or other elements raised from the bottom face or floor of a pocket formed in a fastener head.

In the various embodiments of the invention discussed herein, a tamper-resistant fastener has been described. It should be understood, however, that non tamper-resistant fasteners may also benefit from advantages of the invention. For example, the invention's ability to drive a fastener to a desired torque can be used with non tamper-resistant fasteners such as an ordinary hex head bolt. A pocket as described herein could be formed in the head of the bolt. The tool tip of FIGS. 8 and 9 could then be used to install the bolt with a precise torque. If removal of the bolt later becomes necessary, a wrench mating with the hex-shape on the outer surface of the bolt head can be used to remove the bolt.

Similarly, the pocket/pin/raised portion combinations of FIGS. 15, 16, 18, 19, and 21–25 can be implemented in an ordinary hex head bolt. The appropriate tool (e.g., one of the tools of FIG. 17 or 20) could then be used to install the bolt. If removal of the bolt later becomes necessary, the hex-shape on the outer surface of the bolt head can be used to remove the bolt.

Finally, the tools of the various embodiments of the invention can be made in a variety of different sizes for use with a variety of different size bolts. The tools can also be made form a variety of materials including steel, hardened steel, titanium, aluminum, and the like.

The fasteners of the various embodiments of the invention can also be made from a variety of materials including steel, hardened steel, titanium, aluminum, ceramic, various plastics and the like.

Advantages of the present invention have been fulfilled by the various installation tools, methods and fastener head designs disclosed herein. It should be noted that further modifications of the invention are possible and will be apparent to those skilled in the art based on this disclosure. Thus, the scope of the present invention should not be limited to the specific embodiments set forth herein, but is defined by the claims appended hereto.

What is claimed is:

1. A kit comprising:
   a fastener having a threaded shank defining a longitudinal axis and a head attached to said threaded shank along said longitudinal axis, said head having a pocket formed therein, said pocket having substantially cylindrical sidewalls and a raised portion extending from a floor of said pocket; and
   a tool shank having a distal end and a proximal end, said distal end having an opening therein, said opening having a shape corresponding to a shape of said raised portion, wherein said raised portion is configured to shear off at a predetermined torque.

2. The kit of claim 1, wherein said raised portion is a single pin positioned eccentrically within said pocket.

3. The kit of claim 2, wherein said pin is formed from a material different from a material of said shank of said fastener.

4. The kit of claim 1, wherein said raised portion comprises a plurality of pins.

5. The kit of claim 1, wherein said raised portion has the shape of a plus sign.

6. The kit of claim 1, further comprising:
   a removal tool comprising
      a second tool shank defining a second longitudinal axis; and
      a bit rotatably coupled to an end of said shank, said bit rotatable about a third axis independent of rotation of said shank, wherein said third axis is substantially parallel to and offset from said second longitudinal axis.

7. The kit of claim 6, wherein said second tool shank has a substantially cylindrical shape at said end, said bit has a substantially cylindrical shape, and said end of said second shank and said bit have approximately the same diameters.

8. The kit of claim 7, wherein the removal tool further comprises:
   a handle attached to a second end of said second shank.

9. The kit of claim 8, wherein the bit is coupled to said second shank by a pin.

10. The kit of claim 9, further comprising means for retaining said bit on said pin.

11. A fastener comprising:
   a threaded shank defining a longitudinal axis;
   a head attached to said threaded shank along said longitudinal axis, said head having a pocket formed therein, said pocket having substantially cylindrical sidewalls and a raised portion extending from a floor of said pocket, wherein said raised portion is configured to shear off at a predetermined torque.

12. The fastener of claim 11, wherein said raised portion is formed from a material different from a material of said shank of said fastener.

13. The fastener of claim 12, wherein said raised portion is a single pin positioned eccentrically within said pocket.

14. The fastener of claim 11, wherein said raised portion is a single pin positioned eccentrically within said pocket.

15. The fastener of claim 11, wherein said raised portion comprises a plurality of pins.

16. The fastener of claim 11, wherein said raised portion has the shape of a plus sign.

* * * * *